United States Patent [19]
Grover et al.

[11] 3,923,664
[45] Dec. 2, 1975

[54] REVERSE OSMOSIS APPARATUS

[75] Inventors: John Roger Grover, Reading; Ronald Gayler, Wantage; Malcolm Hoban Delve, Wallingford, all of England

[73] Assignee: United Kingdom Atomic Energy Authority, London, England

[22] Filed: Jan. 22, 1974

[21] Appl. No.: 435,521

[30] Foreign Application Priority Data
Jan. 24, 1973 United Kingdom............... 3656/73

[52] U.S. Cl................................. 210/321; 210/456
[51] Int. Cl.².......................................... B01D 31/00
[58] Field of Search ........... 210/321, 336, 433, 456, 210/231; 55/16, 158

[56] References Cited
UNITED STATES PATENTS

| | | | |
|---|---|---|---|
| 3,019,853 | 2/1962 | Kohman et al. | 55/158 |
| 3,398,834 | 8/1968 | Nuttall et al. | 210/433 X |
| 3,610,418 | 10/1971 | Calderwood | 210/336 |
| 3,615,015 | 10/1971 | Busse et al. | 210/231 |
| 3,710,946 | 1/1973 | Sawyer | 210/336 |
| 3,728,256 | 4/1973 | Cooper | 210/321 |
| 3,819,056 | 6/1974 | Aitken et al. | 210/321 |

*Primary Examiner*—Theodore A. Granger
*Attorney, Agent, or Firm*—Larson, Taylor and Hinds

[57] ABSTRACT

Reverse osmosis apparatus comprises a pressure shell, a feed solution inlet, a feed solution outlet, a product outlet, a membrane assembly within the pressure shell, and shell partition means for directing feed solution over parts of the assembly in a sequential manner.

The shell partition means reduces the cross-sectional area of the feed solution flow path and therefore allows a smaller capacity pump to be used so as to yield a higher product water recovery from a lower capacity plant.

The shell partition means may extend both laterally and longitudinally within the pressure shell so as to divide the interior of the shell into semi-cylindrical compartments.

Alternatively the shell partition means may be of tubular form and extend longitudinally within the pressure shell so as to divide the interior of the shell into a central, cylindrical compartment bounded by an outer, annular compartment.

5 Claims, 6 Drawing Figures

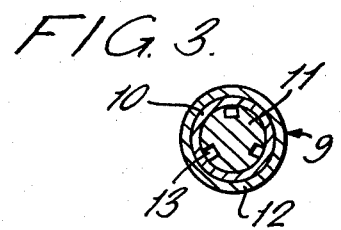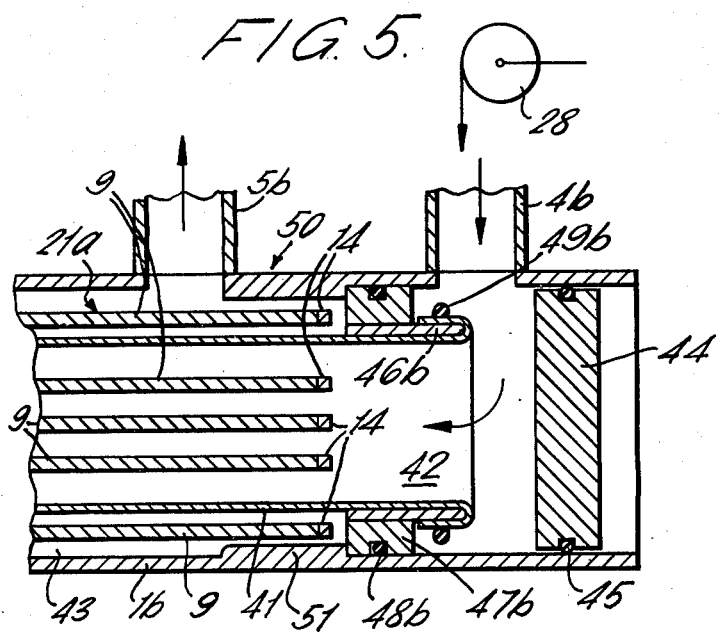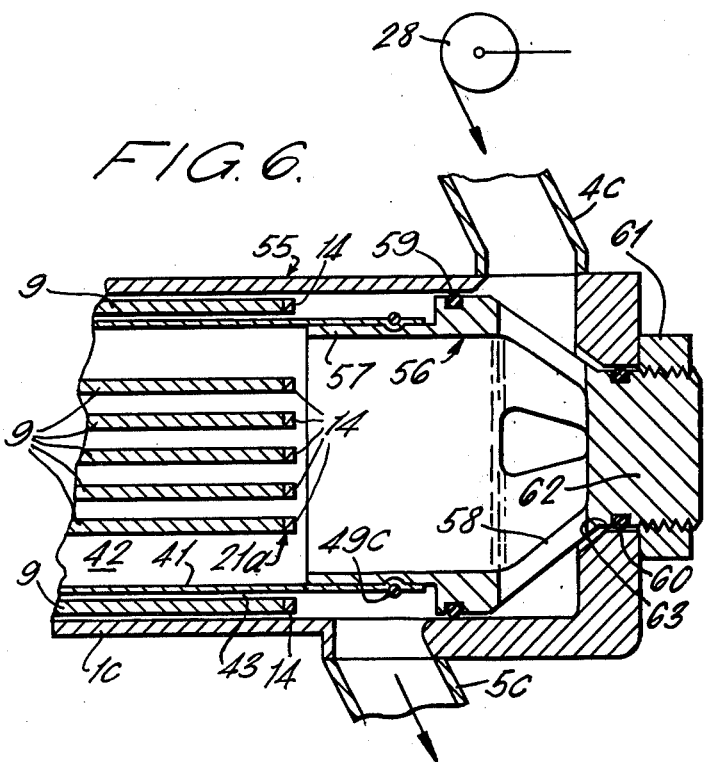

REVERSE OSMOSIS APPARATUS

BACKGROUND TO THE INVENTION

The present invention relates to reverse osmosis apparatus.

British Patent Specification No. 1,325,494 discloses reverse osmosis apparatus. The apparatus comprises a membrane assembly disposed within a pressure shell, with means for passing a feed solution through the assembly so as to obtain product liquid by reverse osmosis. The membrane assembly comprises a bundle of rods with longitudinally extending grooves formed therein, each rod having a permeable substrate covering the rod, with a reverse osmosis membrane being deposited on the substrate. A feed solution is supplied under pressure to the pressure shell so that it contacts the exteriors of the rods, and after passage through the membranes, collects in the grooves as product liquid.

The said Application also discloses that these rods may be conveniently used in bundles of, for example, 19, 37, 61 and 91.

An essentially similar membrane assembly may be constructed using bundles of membrane-coated, porous plastic tubes such as those disclosed in the specification of co-pending British Application No. 54432/71.

If the number of rods or tubes that are used in a bundle is increased to, for example, 127, 169, 217, 271, it is of course necessary to use a larger pressure shell to contain these components and it therefore becomes necessary to increase the volume flow rate to the assembly in order to operate with the preferred brine linear velocity over the membranes, typically 1–3 ft./sec. This leads to practical difficulties in that there is the need for larger pumps to circulate the brine and to the need for using a larger number of bundles in series in order to obtain a high product water recovery.

SUMMARY OF THE INVENTION

According to the present invention, a reverse osmosis apparatus comprises a pressure shell, a feed solution inlet, a feed solution outlet, a product outlet, a membrane assembly within the pressure shell, and shell partition means for directing feed solution over parts of the assembly in a sequential manner.

The shell partition means reduces the cross-sectional area of the feed solution flow path and therefore allows a smaller capacity pump to be used so as to yield a higher product water recovery from a lower capacity plant.

The invention also allows the pressure shell to be of right-circular cylindrical form and the shell partition means to be arranged so that the feed solution inlet and feed solution outlet are disposed at the same end of the pressure shell and the product outlet may be disposed at the other end of the pressure shell. This arrangement allows ease of replacement of rod bundles which use large numbers of rods.

The shell partition means may extend both laterally and longitudinally within the pressure shell so as to divide the interior of the shell into semi-cylindrical compartments.

Alternatively the shell partition means may be of tubular form and extend longitudinally within the pressure shell so as to divide the interior of the shell into a central, cylindrical compartment bounded by an outer, annular compartment.

Embodiments of the invention will now be described, by way of example, with reference to the accompanying drawings, wherein:

BRIEF DESCRIPTION OF THE DRAWINGS

FIG. 3 is a section, to an enlarged scale, of one of the rods in the membrane assembly of FIG. 1, FIGS. 5 and 6 are fragmentary side views in medial section of two modifications.

In the drawings, like reference numbers refer to like components.

DETAILED DESCRIPTION OF THE PREFERRED EMBODIMENTS

Figure 1:
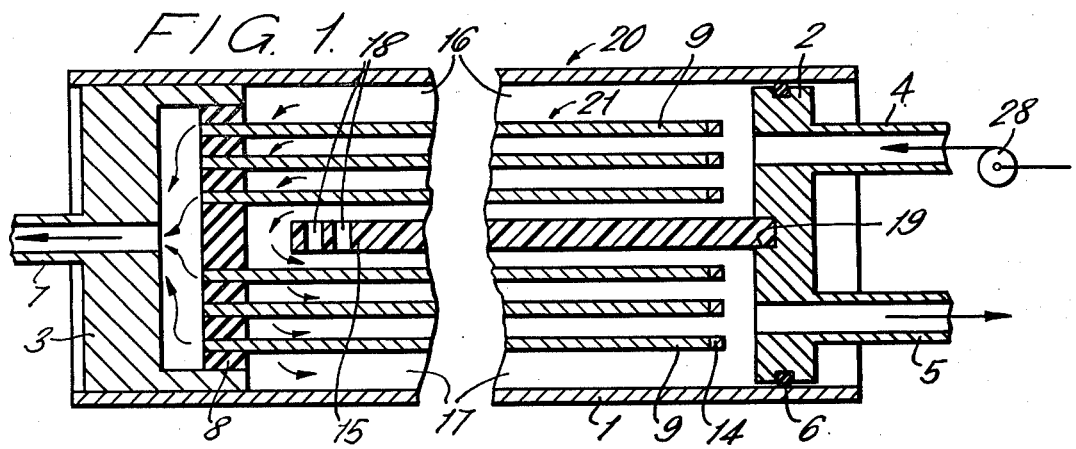
FIG. 1 is a diagrammatic side view, in medial section of one embodiment.

Referring first to FIGS. 1 and 3, reverse osmosis apparatus 20 comprises a pressure shell 1 of right-circular, cylindrical form, closed by a first end plug 2 and a second end plug 3. The end plug 2 is provided with a feed solution inlet 4, for introducing saline feed solution into the pressure shell 1, a feed solution outlet 5, for the passage of the feed solution from the pressure shell 1, and an "O"-ring seal 6. The end plug 3 is provided with a product water outlet 7 and is recessed to accept a holder 8 (a rubber moulding), which substantially seals off the outlet 7 from the remainder of the pressure shell 1. A reverse osmosis membrane assembly 21 is disposed within the pressure shell 1 and comprises a bundle of rods 9 plugged into the holder 8. The rods 9 each comprise (FIG. 3) a permeable substrate in the form of a sleeve 10 covering the rod core 11 and a reverse osmosis membrane 12 deposited on the substrate. The core 11 has three longitudinally extending grooves 13 formed therein.

The saline feed solution passes over the exterior of the rod 9 and water passes through the membrane 12 to collect in the grooves 13 as product liquid.

The rod cores 11 are of one-eighth inch (0.318 cms) diameter extruded plastics material (polypropylene). The grooves 13 are of square section, and of 0.020 inches (0.051 cms) depth and width. The substrate sleeves 10 each comprise a braiding of polyester fibres. The membranes 12 are derived from cellulose acetate applied to the sleeves 10 by passing the rod cores 11 through nozzles whereby membrane dope is extruded to form a substantially uniform thickness on each of the sleeves 10. The free ends of the rods 9 are sealed by tight fitting end caps 14 of rubber. The unsealed ends of the rods 9 pass through the holder 8 so that the grooves 13 of the rods 9 communicate with the product outlet 7.

The pressure shell 1 is partitioned internally by shell partition means comprising a partition-plate 15 which extends both laterally and longitudinally therein, along the axis of the shell, so as to divide the interior of the shell into two semi-cylindrical compartments 16 and 17. The compartments 16 and 17 communicate with each other by means of apertures 18 in the partition-plate 15. The partition-plate 15 is of plastics material and is conveniently located in the pressure shell 1 by engagement with a laterally extending slot 19 formed in the end plug 2. This method of location avoids the need of fixing the partition-plate 15 to the walls of the pressure shell 1, since a slightly higher pressure exists on the inlet side of the partition-plate 15 i.e., in the compartment 16, than on the outlet side, compartment 17, and thus the partition-plate 15 tends to be pushed sideways in the pressure shell 1 to form a seal.

Figure 2:
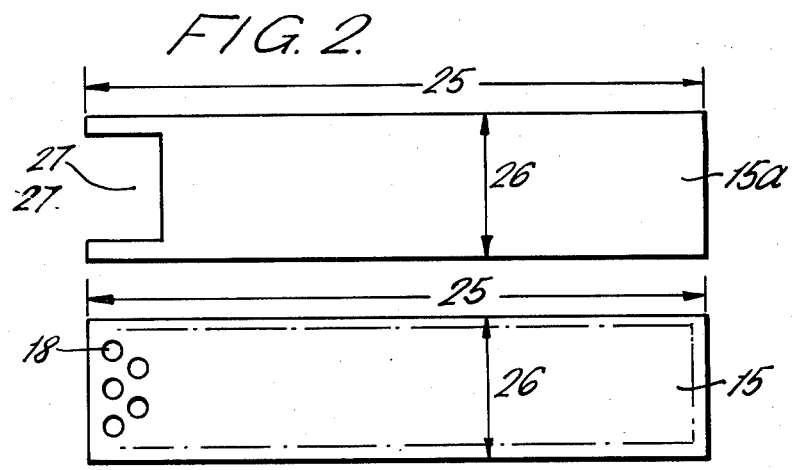
FIG. 2 shows two forms of shell partition means in plan view, suitable for use with the apparatus of FIG. 1.

Fig. 2 shows the partition-plate 15 and also an alternative plate 15a. In both forms the partition plate is rectangularly shaped and of a length 25 (determined by the length of the pressure shell) and a width 26 (which is approximately equal to the internal diameter of the pressure shell 1). In the partition-plate 15a a rectangular portion 27 has been removed from one of its ends so as to provide an aperture joining compartments 16, 17 when the plate is located adjacent to the holder 8.

In operation, an aqueous, saline feed solution is introduced under pressure into the pressure shell 1 through the inlet 4 and by way of a pump 28 to flow over the rods 9 in the compartment 16. The feed solution then passes through the apertures 18 in the partition-plate 15, and over the rods 9 in the compartment 17 to leave the pressure shell 1 by means of the outlet 5.

Water from the feed solution passes through the membranes 12 of the rods 9 whilst the salt impurities in the feed solution do not, thus substantially desalted water passes through the grooves 13 of the rods 9 to be removed by way of the product water outlet 7.

Figure 4:
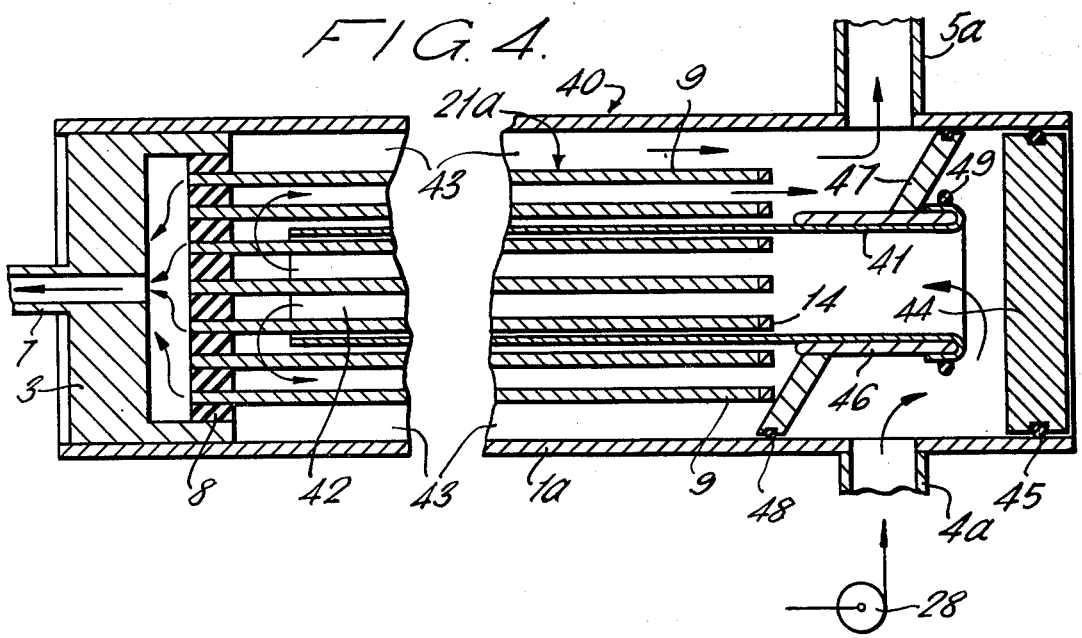
FIG. 4 is similar to FIG. 1 and illustrates the second embodiment.

FIG. 4 illustrates the second embodiment:

Referring to the figure, reverse osmosis apparatus 40 is provided with shell partition means comprising an open-ended tube 41 of thin (0.006 to 0.010 inches thick polythene) plastics material extending longitudinally within the pressure shell 1a so as to divide the interior of the shell into a central, cylindrical, compartment 42, bounded by an outer, annular, compartment 43.

In this embodiment, the membrane assembly 21a has a central rod 9. The partition-tube 41 is disposed coaxially within the bundle of rods 9 which forms the assembly 21a so as to divide the rods into a central group bounded by an outer group. The pressure shell 1a is provided with oppositely disposed feed solution inlet and outlet 4a, 5a at the same end of the pressure vessel 1a, which end is opposite to the end at which the product outlet 7 is positioned. The first-mentioned end of the pressure shell 1a is closed by a removable end plug 44 provided with an "O"-ring seal 45.

The partition-tube 41 is supported at the end nearest the end plug 44 by a sleeve 46 carried by a removable disc 47 which is inclined to the longitudinal axis of the pressure shell 1a and which is sealed to the shell by an "O"-ring joint 48. The supported end of the partition-tube 41 extends through the sleeve 46 where it is doubled back over the sleeve and demountably attached thereto by a rubber ring 49. The unsupported end of the partition-tube 41 is spaced from the holder 8 by a very small gap (0.25 inches).

In operation, saline feed solution is supplied under pressure to the inlet 4a by the pump 28. The solution is constrained by the disc 47 and partition-tube 41 to first flow along the central compartment 42 inside the tube 41 and then back in counterflow along the compartment 43 between the tube 41 and the pressure shell 1a, to leave the latter by way of the outlet 5a. De-salted water passes through the rods 9 to be removed by way of the product outlet 7 as in the previous embodiment.

FIGS. 5 and 6 illustrate modifications of the apparatus shown in FIG. 4.

In FIG. 5 the apparatus 50 has a pressure shell 1b with an inlet 4b and outlet 5b disposed side by side. The inlet and outlet are separated by a disc 47b carrying a sleeve 46b through which the partition-tube 41 extends to be doubled back on itself and to be demountably attached to the sleeve by the rubber ring 49b. The wall of the pressure shell 1b is thickened at 51 so as to prevent the water pressure differential across the disc 47b from moving it along the interior of the shell.

In FIG. 6 the apparatus 55 has a pressure shell 1c with opposed inlet and outlet 4c and 5c respectively, separated by a conical member 56 carrying a sleeve extension 57 over which the partition-tube 41 extends to be demountably attached thereto by a rubber ring 49c. The exterior of the sleeve 57 is grooved to receive that part of the partition-tube 41 gripped by the rubber ring 49c.

The conical member 56 has four equi-spaced apertures 58 which allow feed solution to enter the partition-tube 41. The member 56 is sealed to the pressure shell 1c by "O"-ring seals 59, 60, and is held in place by an external restraint nut 61 engaging with a screw-threaded extension 62 of the member 56, which extension passes through an aperture 63 in the adjacent end wall of the pressure shell.

The non-illustrated ends of the pressure shells 1b and 1c of FIGS. 5 and 6 are sealed by end plugs 3 (see FIG. 4), which plugs also carry the membrane assemblies 21a.

As will be evident from FIGS. 1 to 6, the arrangements shown therein allow a feed solution inlet and outlet to be positioned at one end of each of the pressure shells 1, 1a, 1b, 1c, whilst allowing a product water outlet to be positioned at the other end of the shell. This permits replacement of the rods 9 and the construction of the membrane assembly incorporating the rods 9 to be simplified.

Thus the rods 9 may be replaced by removal of only one end plug, for example at the product water outlet end of the pressure shell. A larger number of such rods than is currently used in a single pressure shell may therefore be replaced in one operation, whilst the flow rate requirement to maintain the preferred brine linear velocity is that for a single smaller assembly containing a smaller number of components. It will be appreciated that it takes approximately the same time to replace a group of rods whether the pressure shell contains 37, 91 or 217 rods and therefore economies in time and labour may be achieved by use of larger groups.

As an alternative to the rods (9) first disclosed by British Patent Specification No. 1,325,494, porous plastics tubes, as disclosed by co-pending British Application No. 54432/71 may be used.

We claim:

1. Reverse osmosis apparatus comprising a pressure shell of cylindrical form, a removable plug-like holder for a membrane assembly at one end of the shell, a membrane assembly in the form of a bundle of rod-like reverse osmosis elements having fluid receiving grooves carried by said holder and extending towards the other end of the shell, a product outlet at the holder end of the shell in fluid communication with said grooves in said reverse osmosis elements, closure means for the other end of the shell comprising a removable plug-like member, shell partition means within said shell extending from said plug-like member in a direction toward said holder and projecting into said membrane assembly and dividing said membrane assembly into first and second groups of rod-like elements, said partition means dividing said shell into a first compartment containing said first group of rod-like elements and a second compartment containing said second group of rod-like elements, fluid communication means at the end of said partition means remote from said plug-like member allowing fluid communication between said first and said second compartments, an inlet for feed solution at the other end of the shell for introducing feed solution into said first compartment and an outlet for feed solution at the other end of the shell for removal of feed solution from said second compartment whereby the feed solution flows from said inlet, through said first compartment, through said fluid communication means, and through said second compartment exteriorly of the reverse osmosis elements to said outlet.

2. Apparatus as claimed in claim 1 wherein the shell is of cylindrical form and wherein the shell partition means extend both laterally and longitudinally within the pressure shell so as to divide the interior of the shell into semi-cylindrical compartments.

3. Apparatus as claimed in claim 1 wherein the shell is of cylindrical form and wherein the shell partition means is of tubular form and extends longitudinally within the pressure shell so as to divide the interior of the shell into a central, cylindrical compartment, bounded by an outer, annular compartment.

4. Reverse osmosis apparatus comprising, a pressure shell of cylindrical form, a holder for a membrane assembly at one end of the shell, a membrane assembly in the form of a bundle of rod-like reverse osmosis elements carried by the said holder and extending towards the other end of the shell, a product outlet at the holder end of the shell in communication with the said elements, a removeable plug-like member at the other end of the shell in the form of a barrier inclined to the longitudinal axis of the shell and spaced from the free ends of the said elements, shell partition means supported at least in part by and extending from the said plug-like member to project longitudinally into the membrane assembly so as to divide that part of the shell containing the assembly into two regions separated from each other by the shell partition means but connected in series relationship by fluid communication means at the end of the said shell partition means remote from the said plug-like member, an inlet for feed solution to the shell, an outlet for feed solution from the shell, the said feed solution inlet and feed solution outlet being disposed opposite to each other and separated by the inclined plug-like member to arrange that the feed solution inlet is connected at one end of the two regions in series relationship and the feed solution outlet is connected at the other end of the said two regions in series relationship, the feed solution being arranged to flow sequentially in the two regions exteriorly of the reverse osmosis elements.

5. Apparatus as claimed in claim 4 wherein the shell is of cylindrical form and wherein the shell partition means is of tubular form and extends longitudinally within the pressure shell so as to divide the interior of the shell into a central, cylindrical compartment, bounded by an outer, annular compartment.

* * * * *